United States Patent [19]
Potter et al.

[11] Patent Number: 6,112,675
[45] Date of Patent: Sep. 5, 2000

[54] PROCESS AND APPARATUS FOR TREATING PROCESS STREAMS FROM A SYSTEM FOR SEPARATING CONSTITUENTS FROM CONTAMINATED MATERIAL

[75] Inventors: Raleigh Wayne Potter, Cumming, Ga.; Michael Fitzgerald, Ocean, N.J.

[73] Assignee: Foster Wheeler Environmental Corporation, Lyndurst, N.J.

[21] Appl. No.: 08/629,410

[22] Filed: Apr. 8, 1996

[51] Int. Cl.[7] ................................................ F23G 5/12
[52] U.S. Cl. .................... 110/229; 110/226; 110/216; 110/346; 405/128
[58] Field of Search ................................ 110/210, 216, 110/226, 229, 342, 346, 211, 215, 221, 223, 224; 405/128

[56] References Cited

U.S. PATENT DOCUMENTS

| | | | |
|---|---|---|---|
| 4,402,274 | 9/1983 | Meenan et al. | 110/346 |
| 4,864,942 | 9/1989 | Fochtman et al. | 110/226 |
| 4,977,839 | 12/1990 | Fochtman et al. | 110/346 |
| 5,086,717 | 2/1992 | McCrossan | 110/346 |
| 5,103,578 | 4/1992 | Rickard | 34/92 |
| 5,188,041 | 2/1993 | Noland et al. | 110/246 |
| 5,250,175 | 10/1993 | DesOrmeaux | 208/356 |
| 5,292,429 | 3/1994 | DesOrmeaux | 208/356 |
| 5,499,586 | 3/1996 | Davis | 110/246 |

FOREIGN PATENT DOCUMENTS

| | | |
|---|---|---|
| 0 373 577 | 6/1990 | European Pat. Off. . |
| WO 90 11475 | 10/1990 | WIPO . |
| WO 92 18214 | 10/1992 | WIPO . |

OTHER PUBLICATIONS

G. Rasmussen, "New Desorption Process Treats Refinery K and F Wastes in Demo Trial", *Oil and Gas Journal*, vol. 92, No. 2, Jan. 10, 1994, pp. 48–51.

*Primary Examiner*—Henry A. Bennett
*Assistant Examiner*—Pamela A. Wilson
*Attorney, Agent, or Firm*—Fitzpatrick, Cella, Harper & Scinto

[57] ABSTRACT

A process and apparatus for recovering and treating hazardous and non-hazardous components from process streams generated from a continuous system for selectively separating organic and inorganic constituents from contaminated material. The contaminated material is heated in a dryer to a first temperature sufficient to volatilize water and lower boiling point constituents contained in the material, thereby producing a dried solid material and a first gas containing water vapor and volatilized lower boiling point constituents. The first gas is separated from the dried solid material. The lower boiling point constituents are recovered from the first gas. The dried solid material is heated in a desorber to a second temperature sufficient to volatilize higher boiling point constituents contained in the dried material, thereby producing a substantially decontaminated solid material and a second gas containing volatilized higher boiling point constituents. The second gas is separated from the substantially contaminated solid material, and the higher boiling point constituents are recovered from the second gas.

58 Claims, 4 Drawing Sheets

PROCESS AND APPARATUS FOR TREATING PROCESS STREAMS FROM A SYSTEM FOR SEPARATING CONSTITUENTS FROM CONTAMINATED MATERIAL

BACKGROUND OF THE INVENTION

1. Field of the Invention

This invention relates to a process and apparatus for removing, recovering and treating hazardous and non-hazardous components from process streams generated from a continuous system for separating organic and inorganic constituents from contaminated material. More particularly, this invention relates to a thermal desorption/recovery process designed to remove and recover constituents generated from processing a solid or sludge feed, using thermal, condensation, solvent stripping, filtration and gravity separation techniques.

2. Description of the Related Art

A need has arisen to decontaminate inert materials such as soil, sludge, biological and other waste materials contaminated with chemical compounds. In particular, it is necessary to decontaminate waste products and recover the resources contained in the waste from early manufactured gas plant (MGP) sites, for example. Also, a need has arisen to recover and treat hazardous and non-hazardous components from process streams generated as a result of manufacturing processes, especially for a process that is flexible and amenable to be used for either discarded waste or in-stream recovery for return to a manufacturing process.

Historically, at the turn of the century, in operating manufactured gas plants, coal was heated to drive off organic gases, which were used for heating and lighting. The gases were sent to very large receiver buildings, typically 100 to 200 feet across, and generally made of concrete or some other cementitious material. The gases were cooled in these receiver buildings. However, these gases contained heavy tars which were separated by cooling and gravity. These tars were separated out from the gases and would build up on the bare ground floors in the receiver buildings. Thus, one to twenty or more feet of soil would be contaminated with these tars. The surrounding ground would likewise be contaminated. This also resulted in pollution of nearby ground water. Accordingly, a need has arisen to decontaminate such soil.

In the past, such contaminated soil or material would be sent to a designated landfill. However, such disposal merely relocates the contaminated soil.

Several attempts have been made to treat such contaminated material. For example, incineration has become a generally accepted means for destroying organic contaminants in such contaminated material. Such incineration may involve collecting, packaging, and transporting a large mass of contaminated material to a licensed incineration facility, heating the large mass of inert solids to very high incineration temperatures to decompose the proportionately small amount of target contaminants and packaging and returning the materials back to the treatment site from where they were removed, or disposed of in a secure landfill. Accordingly, such incineration has drawbacks.

U.S. Pat. No. 5,086,717 (McCrossan) discusses the removal of volatile organic chemicals (VOCs) from soil contaminated with gasoline, diesel fuel and the like. The soil is heated in a burner-heated drum to substantially vaporize the VOC's. The vaporized VOC's are sent to a scrubber to be absorbed into the scrubber water, along with any airborne soil particulates. The VOC and particulate-laden water is then sent to a settling basin to remove the particulates. Particulate-free VOC-laden water is removed from the basin to an air stripper where the VOC's are vaporized. The vaporized VOC's are sent back to the drum burner.

U.S. Pat. No. 5,188,041 (Noland, et al.) discusses removing VOC's from soil and waste materials. The contaminated material is introduced to a hopper, which is sealed from the atmosphere to prevent fugitive emissions of the contaminants. The material is conveyed under sealed conditions into a heated vapor stripping conveyor to strip moisture and contaminants. Non-oxidizing gases are streamed at a controlled temperature over the material to carry the contaminants and moisture away from the material. The flow rate and temperature of the gases are maintained to prevent undue surface drying of the material as it passes through the conveyor.

U.S. Pat. No. 5,150,175 (Des Ormeaux) discusses removing and recovering constituents from a waste stream at temperatures higher than the boiling point of the constituents, and in particular, a process for the treatment of hazardous waste in an inert atmosphere. The waste is heated and moved at a specified retention time, through a heat zone. Components are separated and are released in a gaseous state, either from a liquid or a solid within the waste stream. The gaseous components are transferred through a flow of an inert medium, such as nitrogen gas, to inhibit combustion of the components or to prevent the combination of oxidation, or oxygen being used as a catalyst to form even more hazardous compounds. The gaseous components then are released in a distilled state, which is then mixed with the waste, or in emulsion with the waste stream. This patent also discusses "sweeping" the waste material contained in the heating chamber with an inert or carbon dioxide gas.

Some attempts have been made to separate contaminants from soil or sludges without incineration. For example, U.S. Pat. No. 4,977,839 (Fochtman, et al.) discusses separating chemical contaminants such as VOCs and polychlorinated biphenyls (PCB's) from soils or sludges. The contaminated materials are volatilized below incineration temperature, with continuous removal of evolved vapors, long enough to separate the contaminants. The vapors are catalytically oxidized to destroy the volatilized chemical compounds.

U.S. Pat. No. 5,103,578 (Rickard) relates to the removal of volatile organic compounds such as PCB's from soils, without incineration. The contaminated soil is introduced in batch into a vessel and heated to a temperature between 300° F. to 600° F., preferably in the absence of an inert gas. The vessel is subjected to a vacuum to cause the contaminant to flash to a contaminant vapor, which is condensed to a disposable liquid.

However, none of these patents teaches or suggests a process and apparatus for removing, recovering and treating hazardous and non-hazardous components from process streams generated from a continuous system for separating organic and inorganic constituents from contaminated material, as in the present invention.

SUMMARY OF THE INVENTION

The present invention provides a process and apparatus for removing, recovering and treating hazardous and non-hazardous components from process streams generated from a continuous system for separating organic and inorganic constituents from contaminated material.

Generally speaking, the present invention provides a thermal desorption/recovery (TD/R) process and apparatus designed to remove and recover constituents generated from processing a solid or sludge feed, using thermal, condensation, solvent stripping, filtration and gravity separation techniques. To recover a usable product, for example, one that can be used by refineries, it is necessary to eliminate water from the contaminated material. It is known that some conventional systems result in a finely dispersed emulsion of water and oil, which is difficult to break down. The present invention overcomes such drawbacks of conventional systems by effectively separating water from the contaminated material.

The TD/R process and apparatus of the present invention thermally dries and desorbs water and organics from a feed stream of contaminated material in a dryer such as an indirectly heated screw dryer, which is close coupled to a desorber such as an indirectly heated rotary desorber, into separate gas streams. The feed stream is moved through the heated units at a particular retention time, depending on the feed stream characteristics, increasing the temperature of the stream, thus vaporizing the water and organics. The water and those organic and inorganic compounds which boil at or below the boiling point of water are volatilized into a gaseous state in the heated screw dryer, thus generating a water laden gas stream from the dryer. The waste material in the screw dryer is indirectly heated by, for example, hot oil fed to the screw from a hot oil system. The higher boiling organic and inorganic compounds are volatilized into a gaseous state in the rotary desorber, thus generating an organics laden gas stream from the desorber. This stream may also include some residual inorganics. The gaseous compounds are then transferred to separate recovery systems, if desired, through the flow of a sweep gas, such as a low oxygen content flue gas or nitrogen, to suppress or inhibit combustion of the volatilized organics.

The water laden gas stream from the dryer is transferred to a quench and condensing system to remove the majority of the particulate, water and other gaseous components as a cooled liquid. This liquid is then subjected to a gravity separation step to recover the low boiling point organic compounds and treat, as necessary, through filtration/absorption, the condensed water for reuse in the process or discharge.

The organics laden stream generated in the desorber is transferred to a hot oil quench to remove particulates and condition the gas for introduction to an absorber stripping tower. The stripping tower removes the majority of the organics through temperature reduction and absorption by recirculating the cooled liquid stream and, when necessary, adding an appropriate solvent to the recirculated liquid to help strip the organics from the gas stream. The particulates are removed from the liquid stream by filtration and gravity settling and the solids are recycled to the feed stream. The stripped gas stream is then transferred to a condenser which further reduces the gas stream temperature and condenses most of the remaining organics. The condensed liquid is then sent to a gravity separation system to remove any residual water before being sent to storage.

The cooled gas streams from both the dryer and desorber can then be combined and transferred via a vent gas blower to the natural gas fired burners of the rotary desorber where any residual organics are destroyed in the burner flames. The vent gas blower provides the system draft to contain any fugitive emissions and provide the gas motive force to pull the gas streams through the process. The vent gas system has a burner bypass system in the event of burner flame failure so that the system draft is maintained. The bypass is diverted through a carbon adsorber to assure that no contaminates are emitted to the atmosphere. Alternatively, the vent gas stream may be primarily directed to the carbon adsorbers when it is inappropriate, due to the application, to send the stream to the burners.

The flue gas exiting from the desorber burner chamber provides low oxygen content sweep gas to the dryer and desorber with the remainder of the flue gas transferred to the hot oil system heater to recover the energy before being exhausted through the stack to the atmosphere. Alternatively, exhaust gas from the hot oil heater may be combined with the exhaust gas from the desorber burners to provide the dryer and desorber sweep gas. Still further, the flue gas may go directly to the hot oil system heater and then through a nitrogen vaporizer which vaporizes liquid nitrogen to provide an inert sweep gas to the dryer and desorber, if required by the application.

The solids discharged from the rotary desorber are transferred via an inclined cooling screw, which provides a discharge air seal, to a moisturizer mixer where the solids are remoisturized to eliminate dusting, using the treated water condensed from the processed gas streams.

Accordingly, the present invention is directed to a process and apparatus for removing, recovering and treating hazardous and non-hazardous components from process streams generated from a continuous system for selectively separating organic and inorganic constituents from contaminated material. The contaminated material is heated in a dryer to a first temperature sufficient to volatilize water and lower boiling point constituents contained in the material, thereby producing a dried solid material and a first gas containing water vapor and volatilized lower boiling point constituents. The first gas is separated from the dried solid material. The lower boiling point constituents are recovered from the first gas. The dried solid material is heated in a desorber to a second temperature sufficient to volatilize higher boiling point constituents contained in the dried material, thereby producing a substantially decontaminated solid material and a second gas containing volatilized higher boiling point constituents. The second gas is separated from the substantially contaminated solid material, and the higher boiling point constituents are recovered from the second gas.

In a first aspect, the dryer comprises an indirect heated screw dryer having a screw for conveying material, while the first gas is exhausted from the dryer and processed in a water spray quench condenser arrangement and an oil/water separator to recover the lower boiling point contaminants from the first gas. In another aspect, the desorber comprises an indirect fired rotary calciner or pyrolizer desorber. The second gas is exhausted from the desorber and processed in an oil spray quench and an absorber to recover the higher boiling point contaminants from the second gas.

BRIEF DESCRIPTION OF THE DRAWINGS

Like reference numerals have been used for like or corresponding elements throughout the drawings.

DESCRIPTION OF THE PREFERRED EMBODIMENTS

In general, the waste material to be treated according to the present invention may be any material containing organic and inorganic compounds. Typically, the waste material is waste product from manufactured gas plants, biological solids or sludges containing organic and inorganic compounds, and even toxic organics, such as sewage sludges, pyrotechnics, dyes, phenols, polychlorinated biphenyls, polyaromatic hydrocarbons, etc. Additionally, materials containing municipal or industrial wastes, coal, etc. may be treated according to the present invention. The particular organic compounds which are contained in the waste material, and their concentration, is of importance only in regard to the rate of reaction and the maximum temperatures achieved by the desorption process. In other words, any organic compound in any concentration can be desorbed according to the present invention as long as oxygen is limited and the rate of reaction and maximum temperature can be controlled. In addition, when the process of the present invention is operated in the absence of oxygen or with less than the stoichiometric amount of oxygen (e.g., to separate the organic and inorganic components of the waste stream as described below), the concentration of the waste material is less critical as long as the slurry or other form of waste material is pumpable, flowable or otherwise movable.

The residence time of the reactants in the reaction zones is dependent on several factors, including the temperature, the size of the reactors, the flow rates of materials into and through the reaction zones, etc.

In one aspect, and by way of example only, the present invention has been designed to process waste material containing on the average 74% solids, 20% water and 6% organics. With these criteria, the present invention is sized to process approximately 52,000 pounds per hour of waste material. However, one having ordinary skill in the art would recognize that the moisture and organics content, material characteristics and the process temperatures of the waste material are the controlling factors. For example, the system can be used to process up to about 70,000 pounds per hour of waste material having a moisture content on the order of 10%. The present invention also can be utilized to process approximately 10,000 pounds per hour of waste material having a moisture content on the order of 75% or to process as low as about 5000 pounds per hour with waste material having a moisture content on the order of 90%. At these rates, the material can be processed in a period between thirty minutes and two hours. Thus, the present invention is not limited to the particular process criteria such as temperature, solids content and flow rates discussed herein. Rather, many variations are contemplated within the concepts of the present invention.

Figure 1:
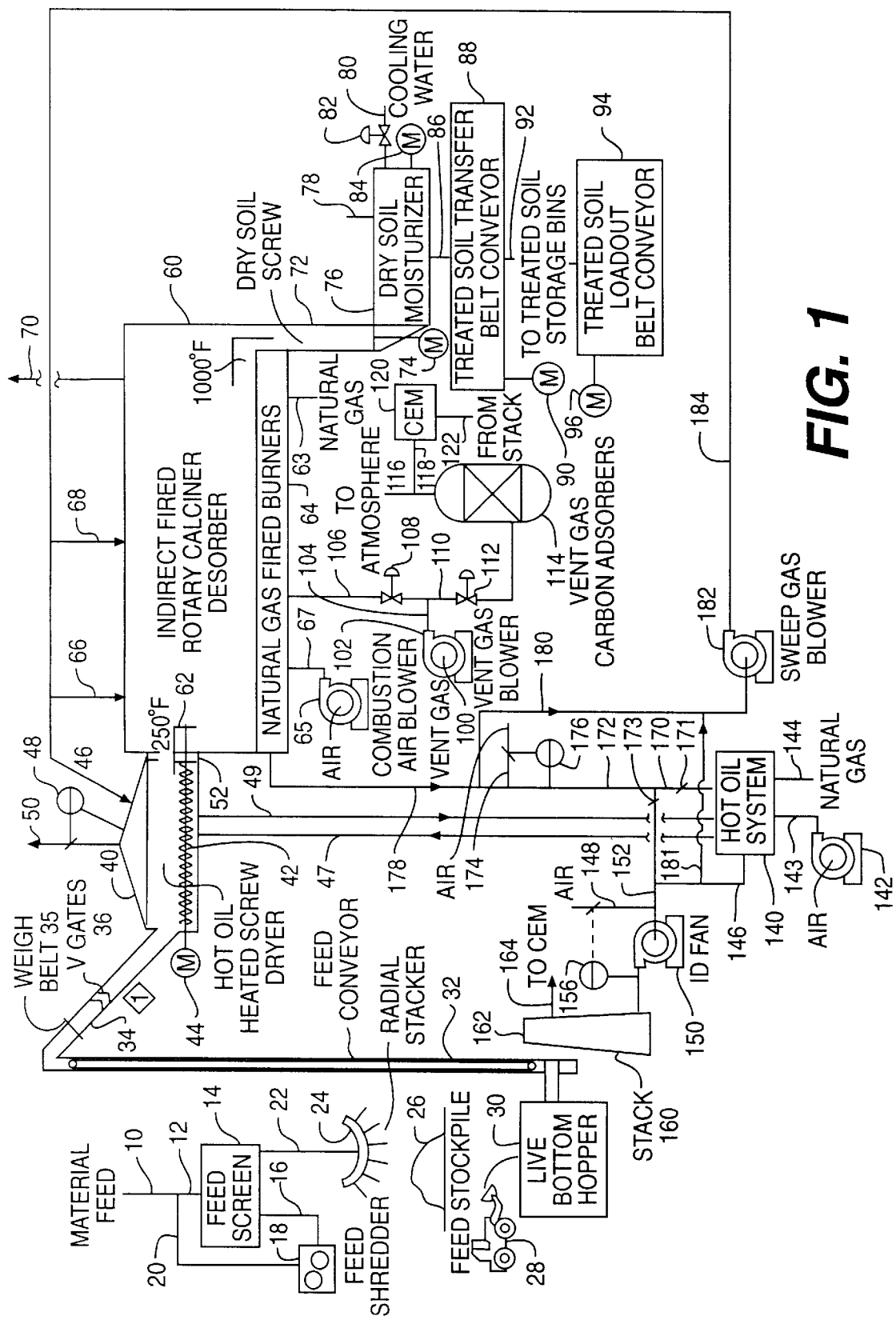
FIG. 1 schematically illustrates a process and apparatus useful for generating process streams from a continuous system for selectively separating organic and inorganic contaminants from contaminated solid material, using (1) an indirect heated hot oil screw dryer coupled with an indirect fired rotary calciner desorber and (2) air and combustion exhaust gas used as a sweep gas.

FIG. 1 schematically illustrates a process and apparatus useful for generating process streams in exhaust gas lines 50 and 70 from a continuous system for selectively separating organic and inorganic contaminants from contaminated material, using, in the preferred embodiment, (1) an indirect heated hot oil screw dryer 40 coupled with an indirect fired rotary calciner or pyrolizer desorber 60 and (2) air and combustion exhaust gas (or nitrogen in the FIG. 2 embodiment) in the sweep gas fed in through lines 46, 66 and 68, as will be discussed in more detail below.

Waste material or process feed is fed into the system through material feed 10. Material feed 10 sends material to a feed screen 14 through feed line 12. Feed screen 14 separates the material feed 10 into oversized and undersized particles. Oversized particles, on the order of two to four inches or greater, are withdrawn from feed screen 14 through oversized particles feed line 16 and are sent to a feed shredder 18. Shredded particles from feed shredder 18 are fed through feed line 20 back into the feed screen 14 together with material feed 10 fed through feed line 12.

Material sized to approximately two to four inches or less is withdrawn from feed screen 14 through sized material outlet 22. This sized material is fed to a movable radial stacker 24. Radial stacker 24 functions as a conveyor to distribute the material in a fairly uniform manner across the stock pile 26, which becomes a blend due to the distribution performed by radial stacker 24.

A front end loader or other moving device 28 feeds material from feed stock pile 26 into live bottom hopper 30. Live bottom hopper 30 is a material feeder for feeding material to conveyor 32. Live bottom hopper 30 provides an initial air plug to the system, and has on the order of four screws in its bottom for conveying material to conveyor 32.

Conveyor 32 comprises an enclosed inclined feed conveyor. Enclosed inclined feed conveyor 32 assists in the continuous process. A belt type conveyor is preferred in this embodiment, as opposed to a bucket type conveyor, because the waste material can be very sticky and tends to agglomerate. Enclosed inclined feed conveyor 32 feeds waste material to inclined feed chute 34. Of course, inclined feed chute 34 also could be vertical, if desired.

Feed chute 34 includes a weigh belt 35 that determines the process feed rate, which is, for example, on the order of 52,000 pounds per hour of waste material given the solids and liquids content discussed above. Again, however, the present invention is not limited to this feed rate. Feed chute 34 also includes a plurality of V-gates 36, which provide a mechanical seal between the discharge of the weigh belt 35 and the feed to the next station. If used, one of the V-gates 36 is always closed in order to prevent excess air infiltration and minimize the possibility of flashback. However, one having ordinary skill in the art recognizes that the V-gates 36 may not even be necessary in some applications, for example, if the organics content of the waste material is very low.

Waste material is fed from V-gates 36 into screw dryer 40. In the preferred embodiment, screw dryer 40 is an indirect heated hot oil screw dryer having two sets of four 24 inch inner diameter by 24 feet long screws. This dryer is available from Denver Sala under the tradename of Holo-flites® or from Christian Engineering, for example. In this system, hot oil flows through heated screw 42 of the dryer, with waste material receiving heat from the screw and being maintained on the outside of the screw. Drive motor 44, which can be hydraulic or electric, drives heated screw 42. Heated screw 42 receives hot oil from feed line 47 and discharges hot oil through discharge line 49 of hot oil system 140, which will be discussed in more detail below. Although a hot oil system is discussed herein, one having ordinary skill in the art understands that other fluids, such as water or steam could be used to heat or provide the heat-transfer medium for the material in dryer 40, depending on the temperatures required.

Feed line 47 supplies hot oil to heated screw 42 at a temperature of approximately 650° F. Discharge line 49 returns hot oil to the hot oil system 140 at a temperature of approximately 300 to 600° F. Hot oil screw dryer 40 also includes a pressure indicating controller 48 that maintains a slight vacuum in the screw dryer 40.

Waste material is typically fed in at ambient temperature and is heated to a process temperature of approximately 200° F. to 350° F. at the outlet end of the screw dryer 40. By way of example, screw dryer 40 has a volume on the order of 800 ft$^3$ with about 245 ft$^3$ being solids and about 545 ft$^3$ being vapor, given the conditions discussed above. Depending on the moisture content of the waste material, the gases above the waste material can be just above the boiling point of water, on the order of 212 to 220° F. As used herein, these gases are termed "lower boiling point gases."

Hot oil screw dryer 40 also includes a sweep gas inlet 46, which receives flue gas from the natural gas or other fired burners 64 of the rotary calciner desorber 60, as will be discussed in more detail below. Sweep gas inlet 46 provides flue gas at about 1000° F. to 1500° F. on the order of 444 pounds per hour (100 scfm), as necessary. One having ordinary skill in the art recognizes that no sweep gas is necessary if the waste material has a low organics content. Therefore, our system can be operated equally well, depending on the material characteristics, without the sweep gas system. When used, sweep gas in sweep gas inlet 46 assists in exhausting gases from screw dryer 40 and in maintaining a partial pressure condition conducive to the drying of the material. Alternatively, the sweep gas can be pulled from the exit of the hot oil heater to provide a lower temperature (on the order of 500° F. to 800° F.) sweep gas when conditions warrant. This is shown by line 181 in FIG. 1. Line 181 has an appropriate control damper (not shown) for flow control.

Exhaust gas is withdrawn from screw dryer 40 through exhaust gas line 50. This exhaust gas contains primarily water, as well as lower boiling point organics—those that boil off at less than about 250° F. By way of example, these lower boiling point organics may include lower boiling point VOCs, such as benzene, toluene and acetone. The exhaust gases in exhaust gas line 50 have a flow rate on the order of about 11,450 pounds per hour, and will be discussed in more detail below with respect to FIG. 3.

Hot oil screw dryer 40 includes a soil discharge breeching 52 for feeding dried waste material into, in the preferred embodiment, indirect fired rotary calciner or pyrolizer desorber 60 by way of transfer feed screw 62. Feed screw 62 feeds heated discharge solids at about 41,600 pounds per hour into desorber 60. Of course, this feed screw 62 also could be a chute or other transfer mechanism.

Desorber 60 receives inlet solids from hot oil screw dryer 40 at approximately 250° F. Desorber 60 has approximately an 8.83 feet inner diameter and is about 72 feet long, and is available from ABB Raymond or Allis Mineral Systems, for example. Other types of heaters capable of generating the operating temperatures discussed herein can be utilized. By way of example, desorber 60 has a volume on the order of 5,400 ft$^3$ with about 4,850 ft$^3$ being vapor and about 550 ft$^3$ being solids, given the conditions discussed above. In this embodiment, desorber 60 is heated by a bank of burners 64 (approximately 24 in this embodiment) running the heated length of the desorber 62. In this embodiment, it is preferred to suplly the burners 64 with natural gas from fuel feed 63. However, one having ordinary skill in the art recognizes that other fuels, such as propane or fuel oil can be used. Also supplied to the burners 64 is ambient air supplied from combustion air blower 65 through feed line 67. Feed line 67 feeds inlet combustion air at a flow rate of about 41,150 pounds per hour to a distribution air header (not shown) for feeding combustion air to each burner. Desorber 60 is maintained at a temperature on the order of 800° F. to 1200° F. Depending on the materials of construction, the outer shell temperature of desorber 60 may reach 1200° F. to 2000° F. Desorber 60 also includes sweep gas inlet 66 for receiving exhaust gases from burners 64 if desired. If sweep gas is utilized, we prefer to feed the sweep gas co-currently with the dried material, in desorber 60. We have found that this can significantly enhance operation with higher boiling point compounds. Burner exhaust gas is provided to sweep gas inlet 66 at a range of 500° F. to 1500° F. on the order of 0 to 2500 pounds per hour (0 to 500 scfm), depending on the organics content and type of waste material being processed. Also provided is a seal gas inlet 68 for feeding sweep gas to the seals provided around the end of the furnace. Seal gas inlet 68 provides up to 100 scfm of exhaust gas at about 750° F.

Exhaust gas is discharged from desorber 60 through exhaust gas line 70. Exhaust gas being exhausted through exhaust gas line 70 has a flow rate of about 7775 pounds per hour and is on the order of 800° F. to 1200° F. This exhaust gas includes sweep gas and organics that boil off at greater than 200° F. to 350° F. By way of example, such gases may include asphaltenes, pyridines, pyrenes, PCBs, polyaromatic hydrocarbons, pentachlorophenols and the like. Exhaust gas discharged in exhaust gas line 70 will be discussed in more detail below with respect to FIG. 4.

Desorber 60 includes an inclined discharge outlet screw 72 for discharging the processed material at about 800° F. to 1200° F. from the calciner desorber 60. Discharge outlet screw 72 also provides an air seal to the desorber 60. Drive motor 74 drives outlet screw 72. Of course, other mechanisms could be used to effect an air seal and to transport solids, such as a rotary or double dump valve in concert with a pan conveyor, for example.

Material discharged from outlet screw 72 will effectively be dry material. Accordingly, this dry material is fed to a dry soil moisturizer 76 that is fed with cooling water 80 controlled by control valve 82 to prevent dusting. Cooling water inlet 80 may originate from treated water system 390 discussed below with respect to FIG. 3. Dry soil moisturizer 76 also includes a steam vent 78 to atmosphere to accommodate material in the dry soil moisturizer, which may be flashed into steam. Steam vent 78 includes a plurality of tortuous paths to separate particles. If necessary, cooling water inlet 80 can include a fresh water inlet (not shown).

Moisturized soil from dry soil moisturizer 76 is fed through moisturized soil discharge 86 using drive motor 84 to a treated soil transfer belt conveyor 88 being driven by drive motor 90. Treated soil transfer belt conveyor 88 may be any suitable transfer conveyor, such as a flat belt, for transferring material to holding bins. Treated soil transfer belt conveyor 88 includes discharge chutes 92 for sending material to storage bins to be held for confirmatory testing. This material is fed to treated soil load out belt conveyor 94 driven by drive motor 96 for loading the material into a truck or load off bin for transport to the original site or another appropriate location.

Vent gas 100 supplied from a condenser discussed below with respect to FIG. 3 feeds treated exhaust gas from hot oil screw dryer 40 at a temperature of approximately 50° F. to 160° F. through vent gas blower 102 and inlet lines 104 and 106 controlled by control valve 108 into distribution headers in natural gas fired burners 64. If desired, some or all of this vent gas 100 can be fed through inlet line 110 controlled by control valve 112 into carbon adsorbers 114. Although one carbon adsorber 114 is shown, typically three 20,000 to 40,000 pound carbon units are used. Such carbon adsorbers are available from Calgon, North American Aqua and other suppliers. One adsorber will be running until being switched over to a second, with the third being a back-up. Carbon adsorbers 114 utilize supported granular carbon with a gas distribution chamber at the bottom where the exhaust gas is fed in from inlet line 110. Exhaust gas is released from carbon adsorbers 114 through exhaust gas line 116 at a temperature of approximately 100° F. As is customary in the industry, sample line 118 feeds exhaust gases to continuous emissions monitoring system 120. Continuous emissions monitoring system 120 also can receive exhaust gases from stack 160, as will be discussed in more detail below, through sample line 122.

As discussed above, hot oil system 140 provides hot oil to the hot oil screw dryer 40 through feed line 47, while hot oil is returned to hot oil system 140 through discharge line 49. Thus, this is a closed oil loop, which has a flow rate of approximately 100 to 1000 gpm. Hot oil system 140 heats the oil to approximately 650° F. Hot oil system 140 is available from First Thermal System or others, and uses thermal fluid available from Dow Chemical or Monsanto. In this embodiment, hot oil system 140 is heated by natural gas supplied from feed line 144. However, fuel oil, propane or equivalent fuel could be used. Combustion air is provided by combustion air blower 142 through combustion air inlet 143. Exhaust gases exit hot oil system 140 through flue gas outlet 146 at a temperature of approximately 750° F. This embodiment also includes the capability to heat the oil using the desorber 60 burner exhaust gases in line 170, thus greatly increasing the overall energy efficiency of the process.

Burner exhaust line 178 withdraws exhaust gases from burners 64 at a temperature of approximately 1600° F. to 2400° F. Air inlet 174 is controlled by temperature indicating controller 176 to feed ambient air into the burner exhaust in exhaust line 172. Exhaust gas line 172 feeds exhaust gas to hot oil system 140 through inlet 170 or to stack 160 through burner exhaust bypass line 152. Exhaust lines 170 and 152 are controlled by dampers 171 and 173, respectively.

If desired, cooling air at ambient temperature can be supplied through air inlet 148 into induced draft fan 150, which receives exhaust gases from lines 152 (from burners 64) or 146 (from hot oil system 140). Temperature indicating controller 156 is located downstream of induced draft fan 150 for controlling the outlet temperature of the exhaust gases. Exhaust gases are fed to conventional exhaust gas stack 160, which may be steel or equivalent. Exhaust gases exit to atmosphere at a temperature of approximately 600° F. through exhaust 162. As discussed above, sample line 164 can feed into continuous emissions monitoring system 120 for monitoring of the exhaust gases.

Some or all of the burner exhaust from burner exhaust line 178 is fed to sweep gas line 180, which pulls off the burner exhaust before air is added. This maintains a less than 5% oxygen content, in order to suppress combustion. (Typically, 3% oxygen content equals no combustion.) Alternatively, the sweep gas can be pulled from hot oil heater exhaust line 146 through line 181 when oxygen content is appropriate and/or when lower sweep gas temperatures are appropriate. Sweep gas in line 180 is fed by sweep gas blower 182 to sweep gas header 184, which supplies sweep gas to hot oil screw dryer 40 through line 46 and to indirect fired rotary calciner desorber 60 through inlet line 66 and to the desorber seals through line 68, as discussed above.

Figure 2:
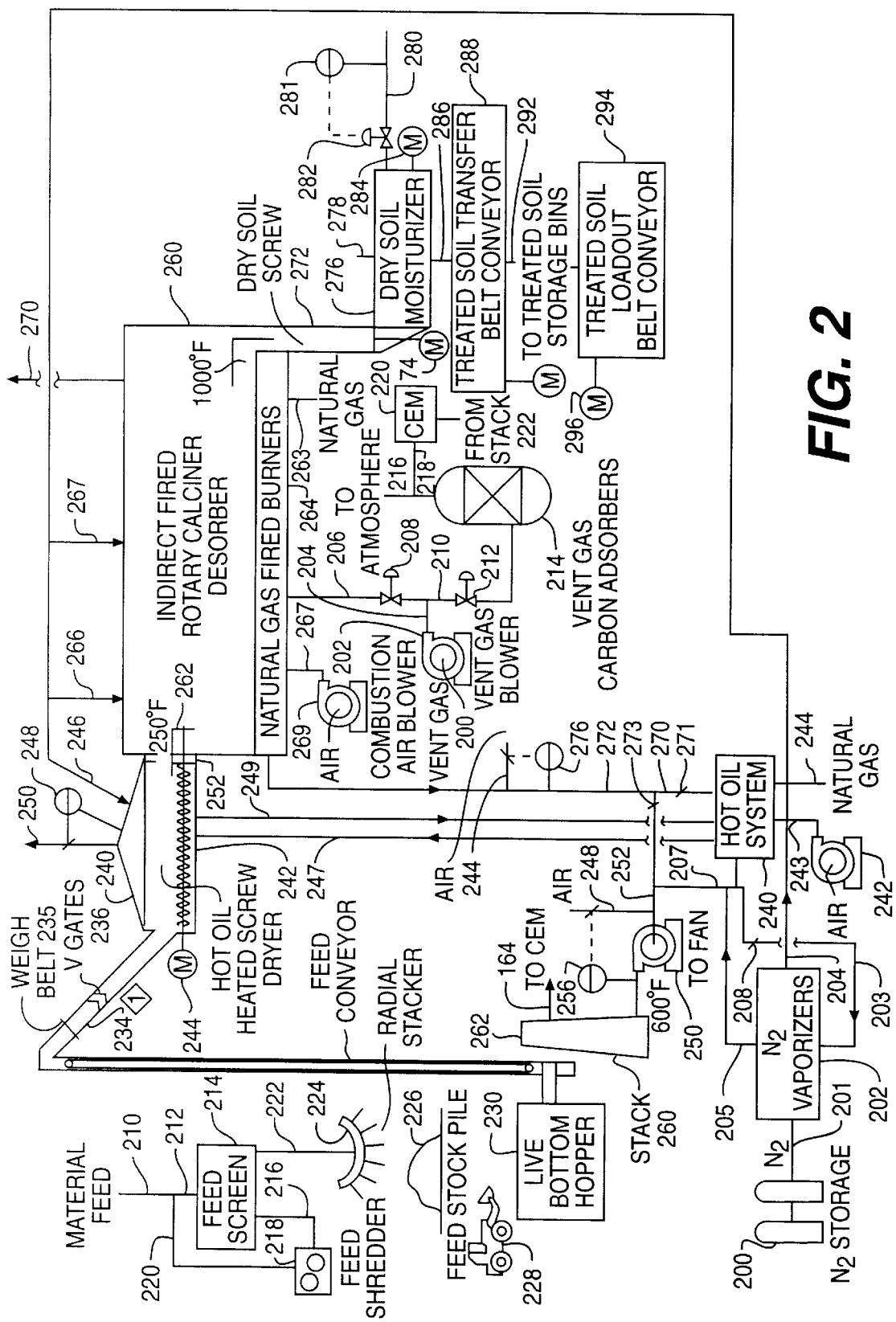
FIG. 2 schematically illustrates a process and apparatus substantially similar to those shown in FIG. 1, but using nitrogen in the sweep gas.

FIG. 2 schematically illustrates a process and apparatus substantially similar to those shown in FIG. 1, but using nitrogen in the sweep gas. The remaining components in FIG. 2 are substantially similar to those discussed above with respect to FIG. 1. That discussion will not be repeated herein.

Although FIG. 2 shows nitrogen for use as the sweep gas, one having ordinary skill in the art recognizes that other inert gases could be used, like $CO_2$ or argon. Accordingly, the invention is not limited to the use of nitrogen.

The system in FIG. 2 includes liquid nitrogen storage tanks 200. Two to four 1,000 to 20,000 gallon tanks may be utilized, depending on need. Liquid nitrogen storage tanks 200 feed liquid nitrogen through nitrogen inlet line 201 to nitrogen vaporizers 202. Nitrogen vaporizers 202 are heat exchangers which convert the liquid nitrogen to gas. Nitrogen vaporizers 202 receive hot gases from hot gas inlet line 203, which receives hot gases from hot oil system 240 through line 206, which is controlled by control damper 208. Exhaust gas from hot oil system 240 in exhaust gas line 206 has a temperature on the order of 700° F. to 1000° F. Exhaust gas in outlet line 205 from nitrogen vaporizers 202 has a temperature on the order of 300° F. to 600° F. Exhaust gas in exhaust gas line 205 can be recirculated through exhaust gas line 203 or sent to stack 260 through exhaust gas line 207. The vaporized nitrogen is fed from header 204 to sweep gas inlet 246 for hot oil screw dryer 240, inlet 266 for indirect fired rotary calciner desorber 260 and inlet 267, which provides seal gas, in the manner discussed above in FIG. 1.

FIG. 2 also shows exhaust gas being withdrawn from hot oil screw dryer 240 through exhaust gas line 250 and exhaust gas being withdrawn from indirect fired rotary calciner desorber 260 through exhaust gas line 270. Exhaust gas in line 250 and exhaust gas in line 270 will be discussed in more detail below with respect to FIGS. 3 and 4, respectively.

Figure 3:
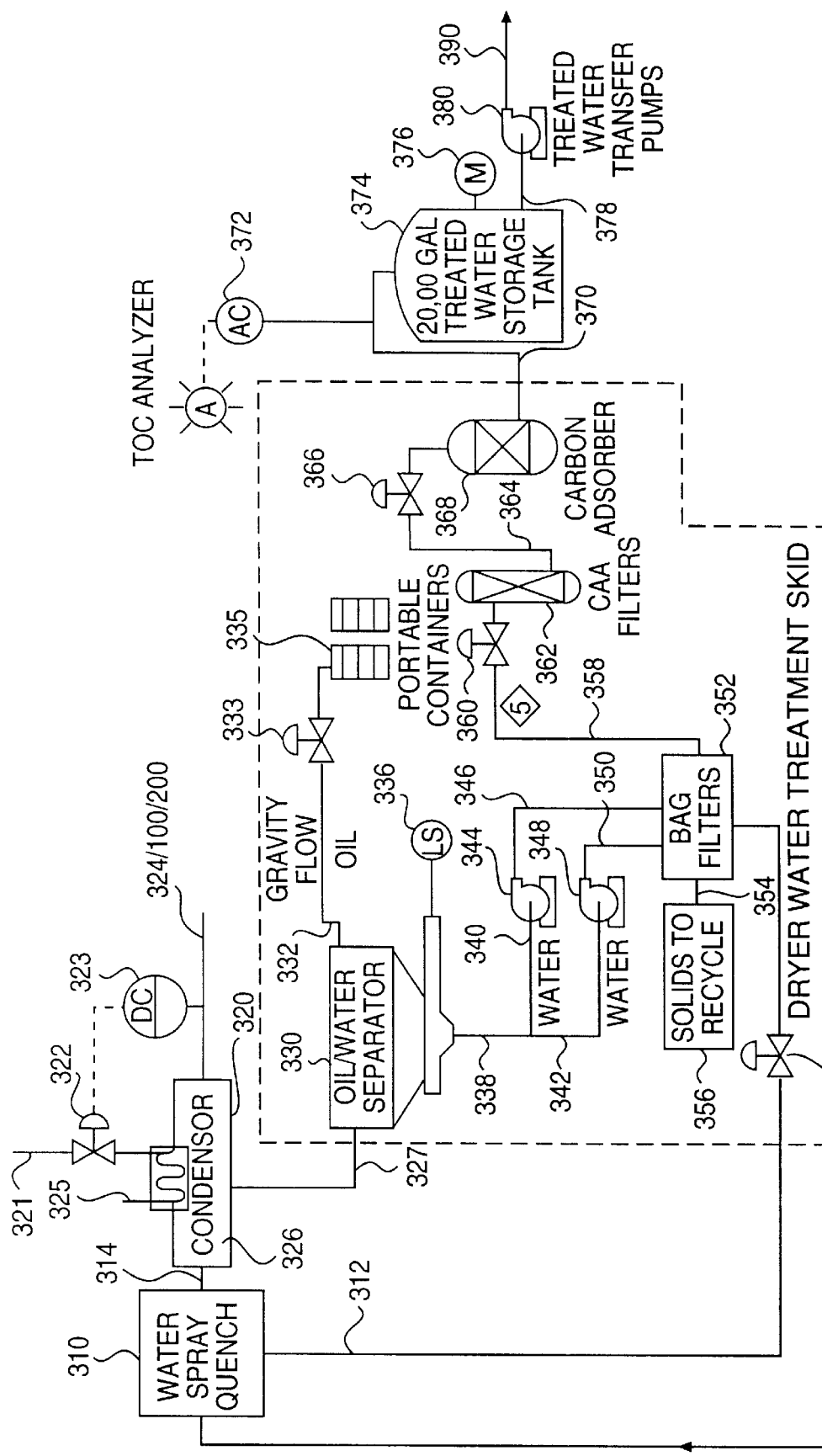
FIG. 3 schematically illustrates a process and apparatus useful for recovering and treating hazardous and non-hazardous components from a process stream generated from the indirect heated hot oil screw dryer shown in FIG. 1 or FIG. 2.

FIG. 3 schematically illustrates a process and apparatus useful for recovering and treating hazardous and non-hazardous components from a process stream generated from the indirect heated hot oil screw dryer 40 or 240, shown in FIGS. 1 or 2, respectively.

By way of example, exhaust gas from exhaust gas line 50 or 250 is fed at about 11,450 pounds per hour with about 10,400 pounds per hour being water, 156 pounds per hour being organics and four pounds per hour being particulates, at a temperature on the order of 210° F. to 250° F. to water spray quench device 310, in which water is atomized into the gas stream at a flow rate of about 12,500 pounds per hour (25 gpm). The gas stream is at a temperature of between 100 to 150° F. Water spray quench 310 is available from Turbotak, for example. In water spray quench 310, particulates and condensed exhaust gases drop out with the water droplets. Water supply line 312 controlled by control valve 311 feeds water at a flow rate of about 12,500 pounds per hour at about 100° F. to 150° F. and at a pressure of approximately 100 to 150 psi to obtain good droplet size definition. Quenched gas outlet 314 feeds quenched gas to condenser 320, which condenses out water and organics. Condenser 320 is on the order of 12 MM BTUH in the form of a shell and tube heat exchanger having condenser coils 326. These condenser coils may be supplied by Doyle and Roth.

Cooling water is supplied to condenser coils 326 through cooling water inlet 321 at a temperature of from ambient to about 100° F. Cooling water (warmed) exits condenser coils from cooling water outlet 325. Cooling water inlet 321 is controlled by control valve 322 and a temperature indicating controller 323 that senses the temperature of the vent gas in vent gas outlet 324, which is at about 100° F. to 150° F. with a flow rate of about 3600 pounds per hour (2630 pounds per hour water, 80 pounds per hour organics and 1.2 pounds per hour particulates). Vent gas from vent gas outlet 324 may be supplied to vent gas inlet 100 or 200 as shown in FIGS. 1 or 2, respectively.

Condensed liquid is drawn from condenser 320 through condensed liquid outlet 327. This condensed liquid is mostly water at a temperature of between 50° F. and 150° F. and has a flow rate of about 20,350 pounds per hour. This condensed liquid is fed to oil/water separator 330 that comprises a 5,000 gallon tank with baffles. Oil/water separator may be supplied by Great Lakes Environmental. Lighter oils from oil/water separator 330 are withdrawn through outlet 332 at about 78 pounds per hour at about 50° F. to 150° F. As used herein, "lighter oils" are those oils that are lighter than water and may include those conventionally known as BTEX (benzene, toluene, ethylene and xylene) compounds. These BTEX compounds may be put back into the oil in storage tank 470 discussed below with respect to FIG. 4 in order to reduce the viscosity and make the oil more flowable. The lighter oils in outlet 332 are at a temperature of about ambient plus 10 or 20° F., depending on flow rate. This flow rate is controlled by control valve 333. The lighter oils are sent to portable containers 335. These portable containers may simply be 50 gallon drums or tanks or 1,000 gallon tanks on farm wagons, for example.

Level switch 336 controls the level in the oil/water separator 330. Condensed water is withdrawn from oil/water separator 330 through condensed through condensed water outlet 338 at about 50° F. to 150° F. and a flow rate of about 20,350 pounds per hour. This condensed water is fed to low pressure pump 344 through inlet 340 and/or high pressure pump 348 through inlet 342. Low pressure pump 344 operates at approximately 30 psi, while high pressure pump 348 operates at approximately 150 psi. Low pressure pump outlet 346 and high pressure pump outlet 350 feed water to bag filters 352. Separate bag filter sets are provided in bag filters 352 for each pump because of the pressure differential. For example, two filter banks of six filters each may be provided for each outlet, with three of these being on-line and three being off-line. Bag filters 352 typically comprise felt filters, which are disposable. Wet solids including filter bags are withdrawn from bag filters 352 through line 354 and are sent to holding tank 356 for solids to be recycled. These solids in holding tank 356 may be returned, filter bags and all, to material feed 10 shown in FIG. 1, for example.

Bag filters 352 also include water outlet 358, the flow of which is controlled at about 7850 pounds per hour at about 50° F. to 150° F. by control valve 360 for feed into clay anthracite adsorbent (CAA) filters 362. These filters adsorb "large" (on the order of 10 μm) oil droplets. CAA filters 362 may be supplied by Great Lakes Environmental. Filter water exits CAA filters 362 through filtered water line 364 which is controlled by control valve 366 for feed to carbon adsorber 368.

Carbon adsorber 368 also can be supplied by Great Lakes Environmental and utilizes granulated activated carbon. Carbon adsorber 368 adsorbs dissolved organics that are finely dispersed or solubilized in water, e.g., alcohols and dissolved BTEX compounds. Treated water transfer line 370 withdraws treated water from carbon adsorber 368 for feed to treated water storage tank 374. Analyzing controller 372 checks for replacement of the carbon units by monitoring an appropriate parameter or parameters, such as total organic carbon content. Treated water storage tank 374 may be merely a 20,000 gallon polypropylene tank or a fractionator, i.e., a sloped bottom, transportable truck trailer tank.

The water level in treated water storage tank 374 is monitored by level indicator 376. When desired or necessary, water can be withdrawn from treated water storage tank 374 through transfer water line 378 by treated water transfer pumps 380, which are on the order of 50 gpm. Treated water in treated water outlet 390 is sent to a header (not shown) to be sent to a cooling tower (not shown), soil moisturizer 76 shown in FIG. 1, through line 80, or to discharge.

Figure 4:
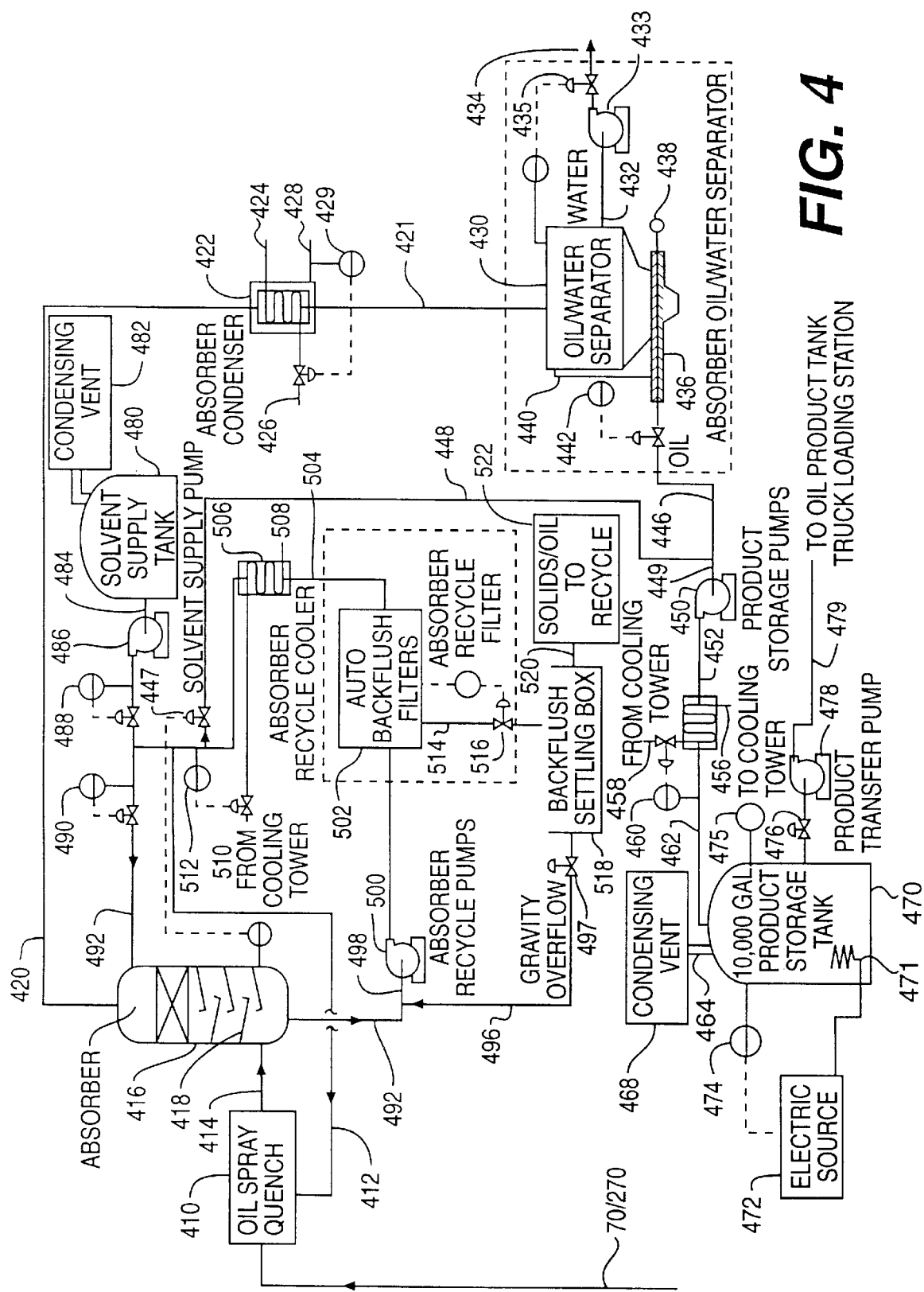
FIG. 4 schematically illustrates a process and apparatus useful for recovering and treating hazardous and non-hazardous components from a process stream generated from the indirect fired rotary calciner desorber shown in FIG. 1 or FIG. 2.

FIG. 4 schematically illustrates a process and apparatus useful for recovering and treating hazardous and non-hazardous components from a process stream generated from the indirect fired rotary calciner desorber 60 or 260 shown in FIG. 1 or FIG. 2, for example.

By way of example, exhaust gas in exhaust gas line 70 or 270 is fed to oil spray quench 410 at a temperature on the order of 800° F. to 1200° F. at about 7775 pounds per hour with about 2965 pounds per hour being organics and 1925 pounds per hour being particulates and the remainder being sweep gas. Oil spray quench 410 could be a quench elbow that includes a pipe with spray nozzles angled down into the sump of absorber 416. Oil spray quench 410 includes quench spray inlet 412 for oil at a temperature of approximately 250° F. and a flow rate of about 29,950 pounds per hour and an exhaust stream outlet 414 at approximately 350° F. Exhaust stream 414 includes exhaust gas and oil in a condensed, quenched stream having liquid and gaseous components. Exhaust stream 414 feeds exhaust gas to absorber stripper tray tower 416, which is available from Glitsch Technologies, for example. Absorber 416 includes stripper trays 418 for stripping out heavy oils, such as asphaltenes, pyridines and pyrenes. Exhaust gas is withdrawn in separated gas stream 420 at about 3500 pounds per hour and a temperature of about 250° F. This exhaust gas is primarily lower boiling point organics (583 pounds per hour) with some residual water and particulates (29 pounds per hour), at a temperature on the order of 250° F. This temperature will be very close to the control temperature and can be varied as desired.

The exhaust gas in separated gas stream 420 is sent to absorber condenser 422, a shell and tube heat exchanger, for condensing out lower boiling point compounds and residual water. It should be noted that this condenser should be made easy to clean, because of the composition of the compounds in the feed stream. Cooling water inlet 426 feeds cooling water at about 50° F. to 100° F. Cooling water outlet 424 withdraws water from condenser 422 at a temperature about 50° F. to 120° F. Absorber condenser 422 includes condenser coils 427. Condenser vent gas outlet 428 exhausts separated gases. Temperature indicating controller 429 controls the cooling water flow rate, as desired. Condensed liquid outlet 421 withdraws condensed liquid at about 50° F. to 120° F. to be sent to oil/water separator 430, which is designed for both lighter and heavier than water materials. Oil/water separator 430 may be supplied by Great Lakes Environmental. Oil/water separator 430 includes separated water outlet 432 withdrawn at a flow rate of about 228 pounds per hour and a temperature of about 50° F. to 120° F. by residual water pump 433, sized as necessary (on the order of 10 to 50 gpm). Residual water 434 can be sent to oil/water separator 330 shown in FIG. 3 for further treatment. Water level indicating controller 435 controls the liquid level in oil/water separator 430.

Screw conveyor outlet 436, driven by drive motor 438, is designed for forcing out sludges and heavy oils from oil/ water separator 430. Light oils are drawn from oil/water separator 430 through light oil exhaust line 440 and are fed into screw conveyor 436. A level indicating controller 442 monitors the level of the sludges and heavy oils in screw conveyor 436.

Recovered heavy oil product is withdrawn from screw conveyor 436 in recovered heavy oil product line 446.

Some oil product may be drawn off from absorber 416 by product return 448 when indicated as being necessary by level indicating controller and control valve combination 447. This product in product return 448 can be combined with recovered heavy oil product in line 446 to be sent to storage in line 449. Product storage pumps 450 pump recovered heavy oil product from line 449 to line 452 into product cooler 454. In some applications, product cooler 454 may not be necessary. Nevertheless, when used, product cooler 454 cools the product from about 120° F. down to any necessary temperature. Product cooler 454 includes cooling water inlet 458, the flow of which is controlled by temperature indicating controller 460 and control valve to provide cooling water to product cooler 454. cooling water outlet 456 returns cooling water to the cooling water loop or to a cooling tower, for example.

Cooled product is withdrawn from product cooler 454 through cooled product outlet 462 at a flow rate of about 1.3 gpm and into product storage tank 470. Product storage tank 470 may be equivalent to treated water storage tank 374 discussed above with respect to FIG. 3. However, product storage tank 470 includes an electric tank heater 471 that is powered by electric power source 472 controlled by temperature indicator 474. Product storage tank 470 also includes a level indicator (e.g., sight glass) 475. A control valve, such as a manual control valve 476, is provided for withdrawing product from product storage tank 470. Product transfer pump 478 withdraws product at a flow rate of approximately 10 to 50 gpm to be sent to oil product load line 479 to be loaded into tanker trucks, for example.

Product storage tank 470 also includes a condensing vent 468 (e.g., an air vent) that condenses any residual VOCs, for example, back to a liquid. Condensing vent 468 is available from Graham Manufacturing.

If required, absorber 416 can be provided with a solvent supply system discussed below. Solvent supply tank 480 contains, as is known in the industry, light cycle oil (high aromatics content), or other appropriate solvent such as hexane or toluene, or recycled BTEX compounds recovered from the dryer exhaust stream 50/250 and recycled from the downstream absorber condenser. Solvent supply tank 480 includes a condensing vent 482, similar to condensing vent 468 discussed above.

Solvent supply tank 480 includes solvent supply line 484 (at about 200° F. and a flow rate of about 9.5 gpm) and solvent supply pump 486 for feeding solvents to absorber 416 through recycle flow (reflux) line 492. The solvents are used to strip organics out, if necessary. Flow indicating controller and valve 488 control flow of solvent to absorber 488.

Absorber 416 also includes separated liquid stream 494, which includes stripped liquid organics taken out by stripper trays 418. Liquid stream 494 has a temperature of about 350° F. and a flow rate of about 2370 pounds per hour with about 1895 pounds per hour of particulates. Combined liquid stream line 498 includes liquid from separated liquid stream line 494 and liquid from return line 496. Liquid in combined liquid stream 498 is sent to absorber recycle pumps 500, which pump liquid to auto backflush filters 502.

These filters are available from Krystal Klear or Rosemont. Auto backflush filters 502 are typically stainless steel filters that are periodically and automatically purged, due to the heavy particulates which they separate. Filtered liquid outlet recycle line 504 returns filtered liquid to absorber 416. Absorber recycle cooler 506 is sized at about 2 MM BTUH and cools the liquid in filtered liquid outlet recycle line 504 to about 250° F. Absorber recycle cooler 506 includes cooling water inlet 510 controlled by temperature indicating controller 512 to maintain about 250° F. and cooling water outlet 508. As discussed above, this cooled liquid can be returned to absorber 416 through reflux line 492 or sent through supply line 448 to be mixed with recovered heavy oil product in line 446. Liquid in reflux line 492, having a temperature of about 200° F. to 350° F. and a flow rate of about 10 to 50 gpm, is controlled by flow indicating controller and control valve 490.

Auto backflush filters 502 include backflush line 514 controlled by timer control valve 516, which sends backflush at about 11,450 pounds per hour and a temperature of about 200° F. to 350° F. to backflush settling box 518. Backflush settling box 518 may be a 20 to 40 cubic yard roll off system. Backflush settling box 518 includes a solid separate line 520, which provides solids to recycle 522. These solids also include residual oil and may be sent back to material feed 10 discussed above with respect to FIG. 1. Liquids are drawn from backflush settling box 518 by return line 496, which is controlled by control valve 497.

By such an arrangement, the present invention provides a system in which all materials can be recycled within the system or disposed of in a controlled manner. Thus, the present invention provides a recovery and recycling process with decontamination of soil and sludges. In this system, organic (and, if desired, inorganic) components are recovered and recycled in a useful process. Also, the separate gas stream systems significantly increase the recovery of particular components. In one aspect, the hot oil screw dryer 40 drives off water and other organics that separate easily in the oil/water separator. Also, the indirect fired rotary calciner desorber 60 drives off higher boiling compounds. In particular, the desorber has an increased effectiveness in pyrolizing due to the absence of water and the elevated temperature of the material entering the rotary desorber, which allows the system to achieve pyrolysis temperatures much quicker. In this exhaust gas system, exhaust gases and heavy organics are readily separated in a stripping tower without the addition of water. Also, the separated heavy organics are similar to heavy crude oil and can be used as a feedstock for a refinery, for example.

While the present invention has been described with respect to what is currently considered to be the preferred embodiments, it is to be understood that the invention is not limited to the disclosed embodiments. To the contrary, the invention is intended to cover various modifications and equivalent arrangements included within the spirit and scope of the appended claims. The scope of the following claims is to be accorded the broadest interpretation so as to encompass all such modifications and equivalent structures and functions.

What is claimed is:

1. A process for recovering and treating hazardous and non-hazardous components from process streams generated from a continuous system for selectively separating organic and inorganic constituents from contaminated material, said process comprising:

(a) heating, in a dryer, the contaminated material to a first temperature sufficient to volatilize water and lower boiling point constituents contained in the material, thereby producing a dried solid material and a first gas containing water vapor and volatilized lower boiling point constituents;

(b) separating the first gas from the dried solid material;

(c) recovering the lower boiling point constituents from the first gas;

(d) heating, in a desorber, the dried solid material to a second temperature sufficient to volatilize higher boiling point constituents contained in the dried material, thereby producing a substantially decontaminated solid material and a second gas containing volatilized higher boiling point constituents;

(e) separating the second gas from the substantially decontaminated solid material;

(f) recovering the higher boiling point constituents from the second gas;

(g) heating the desorber with natural gas fired burners;

(h) exhausting combustion products from the natural gas fired burners; and (i) feeding the exhausted combustion products in step (h) as sweep gas to at least one of (1) the dryer to assist in heating the contaminated material in step (a), and (2) the desorber to assist in heating the dried solid material and maintaining an appropriate partial pressure to effectively desorb contaminants in step (d).

2. A process according to claim 1, wherein the material in step (a) is treated in a dryer, which comprises an indirect heated hot oil screw dryer having a screw for conveying the material.

3. A process according to claim 2, further comprising heating hot oil in a hot oil system and feeding the heated hot oil to the screw to indirectly heat the contaminated solid material fed to the dryer.

4. A process according to claim 3, wherein the desorber in step (d) comprises an indirect fired rotary calciner desorber, and further comprising exhausting combustion products from the natural gas fired burners to the hot oil system to assist in heating the oil.

5. A process according to claim 1, wherein the desorber comprises an indirect fired rotary calciner desorber.

6. A process according to claim 1, further comprising feeding the first gas to a water spray quench and condenser arrangement and separating the first gas into dryer vent gas and condenser/water spray quench condensed liquid.

7. A process according to claim 6, wherein the dried material in step (d) is heated in a desorber heated with natural gas fired burners and feeding the dryer vent gas to at least one of (i) the natural gas fired burners as supplemental fuel and (ii) carbon adsorbers for adsorbing organics from the dryer vent gas.

8. A process according to claim 6, further comprising feeding the condensed liquid to an oil/water separator for separating the condensed liquid into oils lighter than water and separated liquids.

9. A process according to claim 8, wherein the lighter oils include those selected from the group consisting of benzene, toluene, ethylene and xylene.

10. A process according to claim 8, further comprising filtering the separated liquids to separate out solids and liquids.

11. A process according to claim 10, further comprising returning the solids to the contaminated material heated in step (a).

12. A process according to claim 10, further comprising recycling a portion of the separated liquids to the water spray quench and condenser arrangement and sending a portion of the separated liquids to clay anthracite and carbon adsorbers for separating organics from the portion of the separated liquid to produce treated water.

13. A process according to claim 10, further comprising moisturizing the substantially decontaminated solid material separated in step (e), withdrawn from the desorber using the treated water.

14. A process according to claim 1, wherein step (f) comprises feeding the second gas in step (e) to an oil spray quench and generating a quenched stream.

15. A process according to claim 14, further comprising feeding the quenched stream to an absorber and separating the quenched stream into (i) a separated gas stream comprising primarily lower boiling point organics together with residual water and (ii) a condensed liquid outlet.

16. A process according to claim 15, further comprising feeding the separated gas stream to an absorber condenser for condensing the separated gas stream into a condensed stream.

17. A process according to claim 16, further comprising feeding the condensed stream to an oil/water separator, separating the condensed stream into water and heavy oils and withdrawing lighter oils from the oil/water separator.

18. A process according to claim 17, further comprising separately withdrawing the heavy oils, the lighter oils and the water from the oil/water separator.

19. A process according to claim 18, further comprising feeding the water to an oil/water separator used in separating oils and water emanating from a system for treating the first gas separated in step (b).

20. A process according to claim 18, further comprising adding the lighter oils to the heavy oils to form a product oil stream withdrawn from the oil/water separator.

21. A process according to claim 20, further comprising feeding the condensed liquid outlet to backflush filters, generating a filtered liquid outlet and feeding a portion of the filtered liquid outlet to the product oil stream.

22. A process according to claim 18, further comprising feeding the product oil stream to a heated storage tank.

23. A process according to claim 15, further comprising feeding the condensed liquid outlet to backflush filters and generating a filtered liquid outlet and a settling liquid outlet.

24. A process according to claim 23, further comprising feeding the filtered liquid back to the absorber in a reflux line.

25. A process according to claim 24, further comprising feeding a solvent to the reflux line to assist in the separation in the absorber.

26. A process according to claim 23, further comprising feeding a portion of the filtered liquid outlet to the oil spray quench.

27. A process according to claim 1, wherein step (i) comprises feeding the exhausted combustion products in step (h) as sweep gas only to the dryer to assist in heating the contaminated material in step (a).

28. A process according to claim 1, wherein step (i) comprises feeding the exhausted combustion products in step (h) as sweep gas only to the desorber to assist in heating the dried solid material and maintaining an appropriate partial pressure to effectively desorb contaminants in step (d).

29. A process according to claim 1, wherein step (i) comprises feeding the exhausted combustion products in step (h) as sweep gas both to the dryer to assist in heating the contaminated material in step (a) and to the desorber to assist in heating the dried solid material and maintaining an appropriate partial pressure to effectively desorb contaminants in step (d).

30. An apparatus for recovering and treating hazardous and non-hazardous components from process streams generated from a continuous system for selectively separating organic and inorganic constituents from contaminated material, said apparatus comprising:
- a dryer for heating the contaminated material to a first temperature sufficient to volatillize water and lower boiling point constituents contained in the material, thereby producing a dried solid material and a first gas containing water vapor and volatilized lower boiling point constituents;
- a first separation system for separating the first gas from the dried solid material;
- a first recovery system for recovering the lower boiling point constituents from the first gas;
- a desorber for heating the dried solid material to a second temperature sufficient to volatilize higher boiling point constituents contained in the dried material, thereby producing a substantially decontaminated solid material and a second gas containing volatilized higher boiling point constituents;
- a second separation system separating the second gas from the substantially decontaminated solid material;
- a second recovery system for recovering the higher boiling point constituents from the second gas;
- natural gas fired burners for heating the desorber;
- an exhaust line for exhausting combustion products from the natural gas fired burners; and
- a feed system for feeding the exhausted combustion products as sweep gas to at least one of (i) the dryer to assist in heating the material, and (ii) the desorber to assist in heating the dried solid material and maintaining an appropriate partial pressure to effectively desorb contaminants.

31. An apparatus according to claim 30, wherein the dryer comprises an indirect heated hot oil screw dryer having a screw for conveying material.

32. An apparatus according to claim 31, further comprising a heater for heating the hot oil in a hot oil system and a feed system for feeding the heated hot oil to the screw to indirectly heat the contaminated material heated in the dryer.

33. An apparatus according to claim 31, wherein the desorber comprises an indirect fired rotary calciner desorber, and further comprising an exhaust line for exhausting combustion products from the natural gas fired burners to the hot oil system to assist in heating the oil.

34. An apparatus according to claim 30, wherein the desorber comprises an indirect fired rotary calciner desorber.

35. An apparatus according to claim 30, wherein said first recovery system comprises a feed system for feeding the first gas from the dryer to a water spray quench and condenser arrangement and a separator for separating the first gas into dryer vent gas and condenser/water spray quench condensed liquid.

36. An apparatus according to claim 35, further comprising a vent gas feed for feeding the dryer vent gas to at least one of (i) the natural gas fired burners as supplemental fuel and (ii) carbon adsorbers for adsorbing organics from the dryer vent gas.

37. An apparatus according to claim 35, further comprising a condensed liquid feed for feeding the condensed liquid to an oil/water separator for separating the condensed liquid into oils lighter than water and separated liquids.

38. An apparatus according to claim 37, wherein the lighter oils include those selected from the group consisting of benzene, toluene, ethylene and xylene.

39. An apparatus according to claim 37, further comprising a filter for filtering the separated liquids to separate out solids and liquids.

40. An apparatus according to claim 39, further comprising a return line for returning the solids to the contaminated solid material heated in the dryer.

41. An apparatus according to claim 39, further comprising a recycling system for recycling a portion of the separated liquids to the water spray quench and condenser arrangement and an organics separator for sending a portion of the separated liquids to clay anthracite and carbon adsorbers for separating organics from the portion of the separated liquid to produce treated water.

42. An apparatus according to claim 39, further comprising a moisturizer for moisturizing the substantially decontaminated solid material withdrawn from the desorber using the treated water.

43. An apparatus according to claim 30, wherein said second recovery system comprises a feed system for feeding the second gas from the desorber to an oil spray quench that generates a quenched stream.

44. An apparatus according to claim 43, further comprising a quenched stream feed for feeding the quenched stream to an absorber and a separator for separating the quenched stream into (i) a separated gas stream comprising primarily lower boiling point organics together with residual water and (ii) a condensed liquid outlet.

45. An apparatus according to claim 44, further comprising a separated gas stream feed for feeding the separated gas stream to an absorber condenser for condensing the separated gas stream into a condensed stream.

46. An apparatus according to claim 45, further comprising a condensed stream feed for feeding the condensed stream to an oil/water separator, which separates the condensed stream into water and heavy oils, and a discharge line for withdrawing lighter oils from the oil/water separator.

47. An apparatus according to claim 46, further comprising separate discharge lines for separately withdrawing the heavy oils, the lighter oils and the water, from the oil/water separator.

48. An apparatus according to claim 47, further comprising a water feed for feeding the water to an oil/water separator used in separating oils and water emanating from the first recovery system.

49. An apparatus according to claim 47, further comprising a line for adding the lighter oils to the heavy oils to form a product oil stream withdrawn from the oil/water separator.

50. An apparatus according to claim 49, further comprising a condensed liquid outlet for feeding the condensed liquid outlet to backflush filters that generate a filtered liquid, and a filtered liquid outlet for feeding a portion of the filtered liquid outlet to the product oil stream.

51. An apparatus according to claim 52, further comprising a tank feed line for feeding the product oil stream to a heated storage tank.

52. An apparatus according to claim 49, further comprising a condensed liquid outlet feed for feeding the condensed liquid outlet to backflush filters that generate a filtered liquid outlet and a settling liquid outlet.

53. An apparatus according to claim 52, further comprising a filtered liquid feed for feeding the filtered liquid back to the absorber in a reflux line.

54. An apparatus according to claim 53, further comprising a solvent feed for feeding a solvent to the reflux line to assist in the separation in the absorber.

55. An apparatus according to claim 52, further comprising a filtered liquid feed for feeding a portion of the filtered liquid outlet to the oil spray quench.

56. An apparatus according to claim 30, wherein said feed system feeds the exhausted combustion products as sweep gas only to the dryer to assist in heating the contaminated material.

57. An apparatus according to claim 30, wherein said feed system feeds the exhausted combustion products as sweep gas only to the desorber to assist in heating the dried solid material and maintaining an appropriate partial pressure to effectively desorb contaminants.

58. An apparatus according to claim 30, wherein said feed system feeds the exhausted combustion products as sweep gas both to the dryer to assist in heating the contaminated material and to the desorber to assist in heating the dried solid material and maintaining an appropriate partial pressure to effectively desorb contaminants.

* * * * *